Patented Aug. 23, 1949

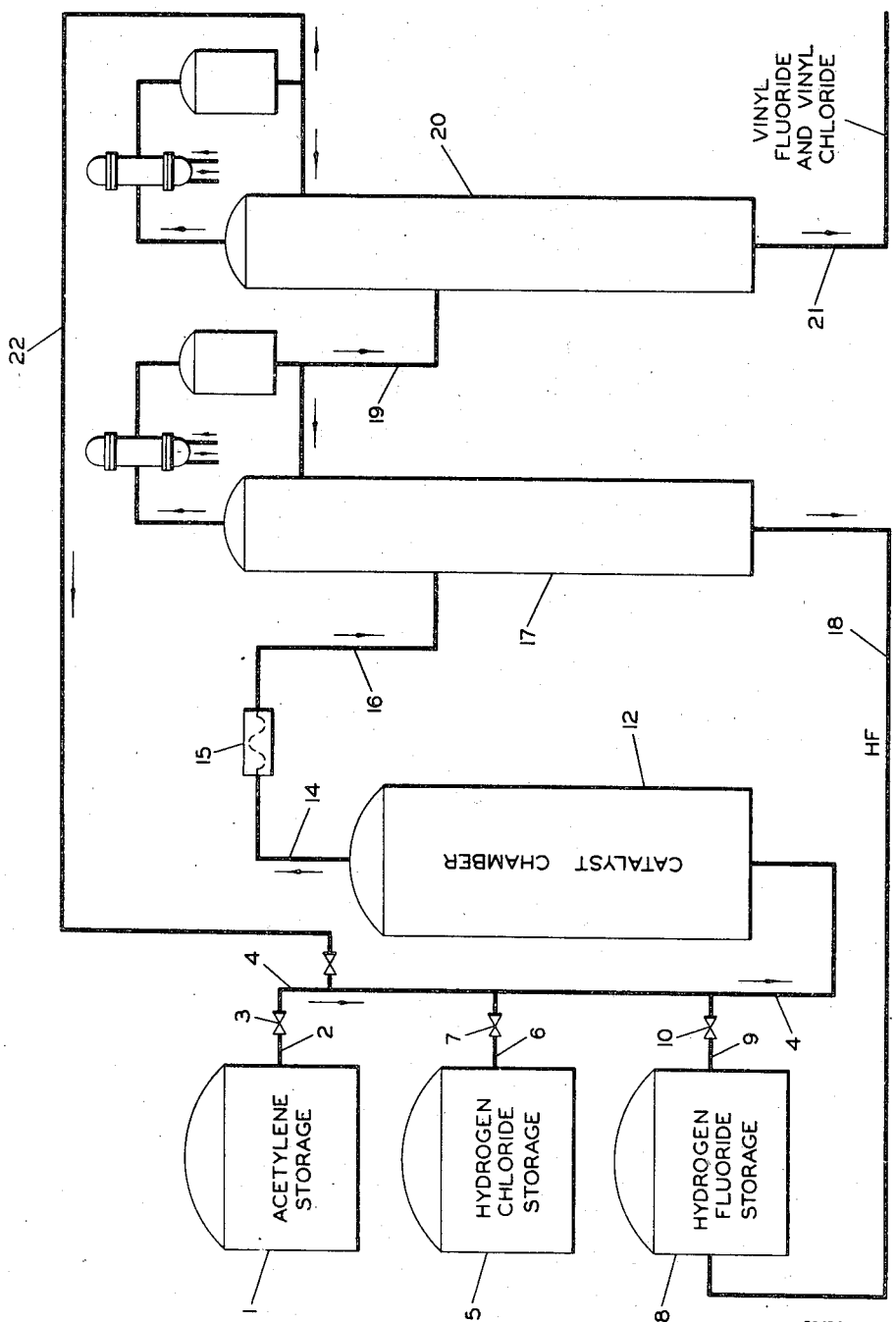

2,480,021

UNITED STATES PATENT OFFICE 2,480,021

PRODUCTION OF VINYL HALIDES

John C. Hillyer, Bartlesville, Okla., assignor to Phillips Petroleum Company, a corporation of Delaware Application May 29, 1947, Serial No. 751,247

14 Claims. (Cl. 260—653)

This invention relates to improvements in catalytic methods for the production of vinyl halides. In one particular aspect it relates to methods for increasing the yield of vinyl fluoride obtained by addition of hydrogen fluoride to acetylene in the presence of mercuric chloride catalysts; in another particular aspect it relates to methods for increasing the length of catalyst life in mercuric chloride catalysts employed in the production of vinyl fluoride. In still another specific aspect it relates to methods for the production of vinyl fluoride-vinyl chloride mixtures suitable for use in the manufacture of synthetic resins.

Vinyl chloride has long been used in the manufacture of synthetic resins. More recently it has been shown that vinyl fluoride has properties particularly valuable for the manufacture of such materials and that its copolymers with vinyl chloride are especially desirable for certain uses. However, methods for large scale production of vinyl fluoride have heretofore been inefficient and economically unsatisfactory. Its utilization has been correspondingly limited for this reason.

The reaction of a hydrogen halide with acetylene has been employed for the production of certain vinyl halides and the use of mercuric halides as catalysts for reactions of this type is old in the art. (See U. S. Patents 2,407,039; 2,407,701; 2,265,509; 2,183,240 and others.) When operating in this manner it has been customary to employ the mercuric salt corresponding to the particular vinyl halide produced, as catalyst for the reaction, either alone, supported on activated carbon or similar material, or in combination with the corresponding halide of an alkaline earth such as calcium or barium halide. It would therefore appear that vinyl fluoride might be obtained by the interaction of hydrogen fluoride with acetylene in the presence of a catalyst comprising mercuric fluoride. Soll, in U. S. Patent 2,118,901, 1938, describes a process of this type. However, mercuric fluoride is extremely difficult to produce and is practically unavailable commercially. Furthermore, mercuric fluoride is very unstable, particularly at elevated temperatures, and this property makes the use of this salt as catalyst for large scale production of vinyl fluoride impractical.

It is also known that vinyl fluoride may be obtained by reacting acetylene and hydrogen fluoride in the presence of a mercuric chloride catalyst, but this method of operation results in low yields and the catalyst quickly becomes depleted, thus rendering this procedure commercially unattractive.

It is an object of this invention to provide a method for increasing the yield of vinyl fluoride obtained by reacting hydrogen fluoride and acetylene in the presence of a mercuric chloride catalyst.

Another object is to provide a method for increasing the length of catalyst life of mercuric chloride catalysts employed in the production of vinyl fluoride from hydrogen fluoride and acetylene.

Another object is to provide a method for producing vinyl fluoride-vinyl chloride mixtures suitable for use in the manufacture of synthetic resins.

Other objects and advantages will be apparent from the following detailed description.

I have now found that by commingling anhydrous hydrogen chloride with the reaction mixture acetylene can be reacted with hydrogen fluoride over mercuric chloride catalysts to give advantageous yields of vinyl fluoride in admixture with vinyl chloride; the proportions of components in the resulting mixture being predetermined by the proportions of hydrogen halides in the reaction mixture. When operating in this manner catalyst life is greatly extended and the yield of vinyl fluoride is greatly increased. This occurs even when the proportion of hydrogen chloride in the reaction mixture is very small.

According to the method of my invention a dry mixture of acetylene, hydrogen fluoride and hydrogen chloride is passed over the catalyst at elevated temperature. One convenient method of preparing such mixture is to blend the acetylene and hydrogen chloride in one feed stream to the catalyst zone and to introduce the required amount of hydrogen fluoride into the catalyst zone in a separate feed stream, although any other method which results in a homogeneous mixture of the three components in gaseous phase may be used. Conditions are maintained which result in substantially complete utilization of acetylene. The reaction product may be collected and cooled by solid carbon dioxide or other suitable refrigerant. The catalyst employed may be mercuric chloride, but is preferably mercuric chloride activated with a chloride of an alkali or alkaline earth metal such as potassium or calcium chloride, deposited on activated carbon. The mercuric chloride content of this preferred catalyst will usually be between 10 and 20 weight per cent of the total composition and the proportion of alkali or alkaline earth metal chloride will be from 1 to 3 mols per mol of mercuric salt. Deposition of the inorganic salts in the carrier may be effected by any suitable method.

In carrying out the process of my invention from 1.5 to 4.0 volumes of hydrogen fluoride per volume of acetylene are present in the reaction mixture. The proportion of hydrogen chloride in the mixture will vary, depending on the composition of the product desired but will generally be from 0.02 to 0.5 volume per volume of hydrogen fluoride.

The temperature in the catalyst zone may be in the range from 200° to 650° F. but I prefer to operate in the range from 300° to 400° F. as substantially complete utilization of acetylene is easily obtained in this range. I also prefer to operate with pressures approximately atmospheric in the catalyst zone although pressures from 0.25 to 5.0 atmospheres or higher may be employed if desired. The pressure used will be limited, in most cases, by the hazard of explosion caused by compressing acetylene. It is generally considered that the upper limit of safe working pressure is obtained in conventional equipment when the partial pressure of acetylene in the reaction mixture is about 2 atmospheres. If the hazards of explosion are overcome in setting up of equipment, such as installing a relatively large number of tubular reaction zones of small diameter or other equipment for high pressure acetylene reactions, the pressure can be greatly increased with resulting increase in the efficiency of this process.

The accompanying drawing shows diagrammatically one particular arrangement of apparatus found advantageous for carrying out a process embodying my invention. Referring thereto, acetylene from storage 1 is led via line 2 containing flow controlling device 3 into line 4. Hydrogen chloride from storage 5 is led via line 6 containing flow controlling device 7 into line 4. Hydrogen fluoride from storage 8 is led via line 9, containing flow controlling device 10 into line 4. Devices 3, 7 and 10 are operated so that for each volume of acetylene passing through line 4 from 0.03 to 2.0 volumes of hydrogen chloride and from 1.5 to 4.0 volumes of hydrogen fluoride are present.

The resulting mixture of gases is introduced into catalyst chamber 12 and is there intimately contacted with a catalyst comprising mercuric chloride at a temperature in the range from 200° to 650° F. Approximately atmospheric pressure is maintained in the catalyst chamber and the rate of flow of the gaseous mixture therein is controlled at from 100 to 200 volumes per volume of catalyst per hour. The effluent from the catalyst chamber is led via line 14 to condenser 15, cooled by solid carbon dioxide or other suitable refrigerant. From condenser 15 the product, which will now be principally liquid is led via line 16 to a low temperature distillation system or other means for separation, which may be composed of one or more distillation columns and any auxiliary equipment desired. When a two column system, as shown, is used the liquefied product from condenser 15 is introduced into column 17 via line 16. A bottoms product of hydrogen fluoride is withdrawn from column 17 via line 18 and is recycled to storage. Materials more volatile than hydrogen fluoride are conducted via line 19 to column 20. A bottoms product of vinyl fluoride and vinyl chloride is withdrawn to use together if desired or passed to separation (not shown). Hydrogen chloride and traces of unreacted acetylene are removed overhead and are recycled via line 22.

An important advantage of the present process lies in the vinyl chloride-vinyl fluoride mixture obtained as a product. As before mentioned, copolymers of vinyl fluoride with vinyl chloride have attained considerable commercial importance. Mixtures of vinyl fluoride and vinyl chloride in any proportion desired may be produced by suitably regulating the proportions of acetylene, hydrogen fluoride and hydrogen chloride in the reaction mixture. By thus producing a mixture of the vinyl halides in the proportion desired separate manufacturing and blending procedures with the necessary equipment and operating expenses are eliminated and significant economic advantages are obtained. If isolation of the components of the mixture should be desired separation can be effected by any suitable means such as low temperature distillation.

The ratio of vinyl fluoride to vinyl chloride in the product increases as the amount of hydrogen chloride in the feed stream is reduced. However, I have discovered that this increase is far in excess of that which could be expected from the reduction in hydrogen chloride effected. For example a reduction of 29 per cent in the hydrogen chloride content of the reaction mixture provided an increase of about 350 per cent in the vinyl fluoride content of the product. Obviously the extent to which hydrogen chloride in the reaction mixture may be reduced approaches a limit for optimum operation since its complete removal results in sharply reduced yields of vinyl fluoride and substantially shortened catalyst life. For practical purposes the ratio of hydrogen chloride to hydrogen fluoride will be at least 0.02/1.00.

The following examples show advantages to be gained from processes embodying my invention.

*Example I*

Acetylene and anhydrous hydrogen chloride were mixed at room temperature in a volume ratio of 4.5:1. This mixture was then combined with 13.1 volumes of hydrogen fluoride and passed over a catalyst comprising mercuric chloride and calcium chloride deposited on activated carbon at a rate of 159 volumes of feed per volume catalyst per hour. Temperature in the catalyst zone was maintained at approximately 350° F. with a pressure substantially atmospheric. The effluent was passed through a condensation tube cooled by solid carbon dioxide. The condensed product was found to comprise 11 per cent vinyl fluoride and 88.9 per cent vinyl chloride.

A second experiment was conducted in the same manner using a ratio of 13.4 volumes of acetylene to 1 volume of hydrogen chloride and adding thereto 45.2 volumes of hydrogen fluoride. The product from this reaction comprised 80 per cent vinyl fluoride and 19.9 per cent vinyl chloride.

*Example II*

An experiment was carried out using the method of Example I but employing a feed stream comprising 1 volume of acetylene to 2 volumes of hydrogen fluoride. No hydrogen chloride was included in the mixture. The catalyst was pretreated by passing hydrogen fluoride through the reaction tube for 3 hours at a temperature of 300° F. prior to starting the run. The temperature in the reactor was held at approximately 400° F. with a flow rate of 45 volumes feed per volume catalyst per hour. No measurable yield of product was obtained.

Example III

An experiment was conducted according to the method of Example II but without pretreatment of the catalyst with hydrogen fluoride. Temperature and flow rate were the same as in Example II. A small yield (16.5 cc.) of clear liquid was obtained after 13 hours. Fractionation of this product indicated it to be 50.7 per cent vinyl fluoride, B. P. —97° F., and 49.3 per cent vinyl chloride, B. P. +5° F.

Example IV

Three experiments were carried out to determine catalyst life with different feed streams. The catalyst and operational techniques were the same as employed in the preceding examples. In this first run a feed comprising 2.3 volumes of hydrogen fluoride to 1 of acetylene was used, in the second acetylene alone, and in the third a mixture of 2.9 volumes of hydrogen fluoride, 1 volume of acetylene, and 0.22 volume of dry hydrogen chloride. Flow rates and temperatures were essentially the same. At the end of each run samples of the catalyst from inlet and outlet ends of the catalyst tube were removed and analyzed to determine the degree of mercuric chloride depletion. The analyses were made by extraction of the mercury with nitric acid and precipitation as the sulfide. Results of these experiments are tabulated below.

| Run | Sample | Feed | Time, Hrs. | Mercury, Per Cent | Yield, cubic centimeters |
|---|---|---|---|---|---|
|  | Control |  |  | 8.9 |  |
| 1 | Inlet | HF—C$_2$H$_2$ | 5.5 | 0.29 | 15.9 |
|  | Outlet |  |  | 2.93 |  |
| 2 | Inlet | C$_2$H$_2$ | 7.5 | 0.22 |  |
|  | Outlet |  |  | 2.16 |  |
| 3 | Inlet | HF—HCl—C$_2$H$_2$ | 11.5 | 1.81 | 61.3 |
|  | Outlet |  |  | 2.61 |  |

All pressures mentioned in this specification are absolute pressures.

Having described my invention and explained its operation, I claim:

1. A process for preparing vinyl fluoride which comprises intimately contacting a mixture of acetylene, hydrogen fluoride and hydrogen chloride with a catalyst comprising mercuric chloride at a temperature in the range from 200° to 650° F. and separating vinyl fluoride from the reaction products.

2. A process for preparing vinyl fluoride which comprises mixing acetylene, hydrogen fluoride and hydrogen chloride in such proportions that for each volume af acetylene 1.5 to 4.0 volumes of hydrogen fluoride and from 0.03 to 2.0 volumes of hydrogen chloride are present in the resulting mixture, intimately contacting said mixture with a catalyst comprising mercuric chloride at a temperature in the range from 200° to 650° F. and under pressure of from 0.25 to 5 atmospheres, and separating vinyl fluoride from the reaction mixture.

3. The process of claim 2 in which the mixture is contacted with the catalyst at a temperature in the range from 300° to 400° F., and under a pressure of about 1 atmosphere.

4. A process for preparing vinyl fluoride which comprises mixing acetylene, hydrogen fluoride and hydrogen chloride in such proportions that for each volume of acetylene 1.5 to 4.0 volumes of hydrogen fluoride and from 0.03 to 4.0 volumes of hydrogen chloride are present in the resulting mixture, introducing a feed stream of said mixture into a catalyst zone at a rate of flow of from 100 to 200 volumes per volume of catalyst per hour, therein intimately contacting said feed stream with a catalyst comprising mercuric chloride at a temperature in the range from 200° to 650° F. and under pressure in the range from 0.25 to 5.0 atmospheres, withdrawing an effluent containing vinyl fluoride from said catalyst zone and separating vinyl fluoride from said effluent.

5. A process for preparing vinyl fluoride which comprises mixing acetylene, hydrogen fluoride and hydrogen chloride in such proportions that for each volume of acetylene 1.5 to 4.0 volumes of hydrogen fluoride and from 0.03 to 4.0 volumes of hydrogen chloride are present in the resulting mixture, introducing a feed stream of said mixture into a catalyst zone at a rate of flow of from 100 to 200 volumes per volume of catalyst per hour, therein intimately contacting said feed stream with a catalyst comprising mercuric chloride at a temperature in the range from 300° to 400° F. and under pressure of about 1 atmosphere, withdrawing an effluent containing vinyl fluoride from said catalyst zone and separating vinyl fluoride from said effluent.

6. A process for preparing vinyl fluoride and vinyl chloride which comprises intimately contacting a mixture of acetylene, hydrogen fluoride and hydrogen chloride with a catalyst comprising mercuric chloride at a temperature in the range from 200° to 650° F. and separating a mixture of vinyl fluoride and vinyl cholride from the reaction products.

7. A process for preparing a mixture of vinyl fluoride and vinyl chloride which comprises mixing acetylene, hydrogen fluoride and hydrogen chloride in such proportions that for each volume of acetylene 1.5 to 4.0 volumes of hydrogen fluoride and from 0.03 to 2.0 volumes of hydrogen chloride are present in the resulting mixture, intimately contacting said mixture with a catalyst comprising mercuric chloride at a temperature in the range from 200° to 650° F. and under pressure of from 0.25 to 5 atmospheres, and separating a mixture of vinyl fluoride and vinyl chloride from the reaction mixture.

8. The process of claim 7 in which the mixture is contacted with the catalyst at a temperature in the range from 300° to 400° F., and under a pressure of about 1 atmosphere.

9. A process for preparing a mixture of vinyl fluoride and vinyl chloride which comprises mixing acetylene, hydrogen fluoride and hydrogen chloride in such proportions that for each volume of acetylene 1.5 to 4.0 volumes of hydrogen fluoride and from 0.03 to 4.0 volumes of hydrogen chloride are present in the resulting mixture, introducing a feed stream of said mixture into a catalyst zone at a rate of flow of from 100 to 200 volumes per volume of catalyst per hour, therein intimately contacting said feed stream with a catalyst comprising mercuric chloride at a temperature in the range from 200° to 650° F. and under pressure in the range from 0.25 to 5.0 atmospheres, withdrawing an effluent containing vinyl fluoride and vinyl chloride from said catalyst zone and separating a mixture of vinyl fluoride and vinyl chloride from said effluent.

10. A process for preparing a mixture of vinyl fluoride and vinyl chloride which comprises mixing acetylene, hydrogen fluoride and hydrogen chloride in such proportions that for each volume of acetylene 1.5 to 4.0 volumes of hydrogen fluoride and from 0.03 to 4.0 volumes of hydrogen chloride are present in the resulting mixture, introducing a feed stream of said mixture into a catalyst zone at a rate of flow of from 100 to 200 volumes per volume of catalyst per hour, therein intimately contacting said feed stream with a catalyst comprising mercuric chloride at a temperature in the range from 300° to 400° F. and under pressure of about 1 atmosphere, withdrawing an effluent containing vinyl fluoride and vinyl chloride from said catalyst zone and separating a mixture of vinyl fluoride and vinyl chloride from said effluent.

11. A process for increasing the yield of vinyl fluoride formed by intimately contacting a mixture comprising acetylene and hydrogen fluoride with a catalyst comprising mercuric chloride which comprises mixing acetylene, hydrogen fluoride and hydrogen chloride in such proportions that for each volume of acetylene 1.5 to 4.0 volumes of hydrogen fluoride and from 0.03 to 2.0 volumes of hydrogen chloride are present in the resulting mixture and intimately contacting said mixture with a catalyst comprising mercuric chloride at a temperature in the range from 200° to 650° F. and under pressure of from 0.25 to 5 atmospheres.

12. The process of claim 11 in which the mixture is contacted with the catalyst at a temperature in the range from 300° to 400° F., and under a pressure of about 1 atmosphere.

13. A process for increasing the length of catalyst life of catalysts comprising mercuric chloride used for the preparation of vinyl fluoride from acetylene and hydrogen fluoride which comprises conducting such preparation by mixing acetylene, hydrogen fluoride and hydrogen chloride in such proportions that for each volume of acetylene 1.5 to 4.0 volumes of hydrogen fluoride and from 0.03 to 2.0 volumes of hydrogen chloride are present in the resulting mixture and intimately contacting said mixture with a catalyst comprising mercuric chloride at a temperature in the range from 200° to 650° F. and under pressure of from 0.25 to 5 atmospheres.

14. The process of claim 13 in which the mixture is contacted with the catalyst at a temperature in the range from 300° to 400° F., and under a pressure of about 1 atmosphere.

JOHN C. HILLYER.

REFERENCES CITED

The following references are of record in the file of this patent:

UNITED STATES PATENTS

| Number | Name | Date |
|---|---|---|
| 2,118,901 | Soll | May 31, 1938 |
| 2,225,635 | Japs | Dec. 24, 1940 |